3,346,405
METAL PROTECTANT
Richard V. Viventi, Niskayuna, N.Y., assignor to General Electric Company, a corporation of New York
No Drawing. Filed Dec. 14, 1964, Ser. No. 418,313
16 Claims. (Cl. 106—14)

ABSTRACT OF THE DISCLOSURE

This invention is directed to organosilanes and organopolysiloxanes which differ from prior art materials by the presence of a silicon-bonded mercaptoalkyl radical. The mercaptoalkyl radical has the formula:

$$HS(CH_2)_a-$$

where $a$ is an integral number of from 3 to 25, inclusive. In the silanes, the remaining valences of silicon are satisfied by hydrolyzable groups and in the siloxanes the remaining valences of silicon not satisfied by oxygen are satisfied by monovalent hydrocarbon radicals. Both the silanes and siloxanes are useful in treating copper and silver to prevent corrosion.

---

This invention relates to a composition of matter for protecting silver and copper surfaces from corrosion and attendant discoloration. More particularly, this invention relates to the use of mercaptoalkyl-substituted organosilicon compounds as the active ingredient in protecting such surfaces.

A wide variety of materials have been proposed in the prior art, as far back as antiquity, for protecting either silver or copper metals from corrosion and corollary discoloration. Most recently, sulfur-containing compounds have been used for this purpose, but have not proved entirely adequate. Again, various organosilicon compounds have been suggested in recent patent literature for purposes of protecting these metals from corrosion. Again, the results have not been entirely satisfactory.

While both sulfur-containing compounds and organosilicon materials have been used as silver and copper protectants, because they have failed to adequately protect silver and copper from sulfur corrosion, in particular, it would not be expected that a combination of the two materials in a single compound would provide any significant level of increased protection. However, in accordance with the present invention, it has unexpectedly been found that an application of a mercaptoalkylsilane or a mercaptoalkyl-substituted organopolysiloxane to either silver or copper prevents appreciable discoloration or corrosion even when the metals are subjected to a concentrated hydrogen sulfide atmosphere.

Briefly, the present invention involves the use, as a metal protectant, of a member selected from the class consisting of mercaptoalkylsilanes having the formula:

(1) $\qquad A_3Si(CH_2)_aSH$ and mercaptoalkyl-substituted organopolysiloxanes having the formula:

(2)
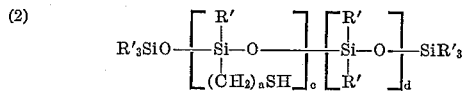

where A is a hydrolyzable radical; $a$ is an integral number of from 3 to 25, inclusive, preferably from 3 to 6, inclusive; R' represents a member selected from the class consisting of alkyl radicals, substituted alklyl radicals, aryl radicals, and substituted aryl radicals; and the sum of $c$ and $d$ is from 10 to 100, preferably from 10 to 30, $c$ is at least as large as $d$, and $d$ can vary from 0 up to the value of $c$. Preferably, the compound is applied to the metal surface to be protected via a solvent solution.

Among the hydrolyzable radicals which A can represent are alkoxy radicals of the formula OR, where R is an alkyl radical of from 1 to 6 carbon atoms; acyloxy radicals; aryloxy radicals; halide radicals; substituted and unsubstituted mercapto radicals; substituted and unsubstituted amine radicals; and radicals of the formula —OR″OR‴ where R″ is a divalent hydrocarbon radical free of aliphatic unsaturation and R‴ is a monovalent hydrocarbon radical free of aliphatic unsaturation.

Although I do not wish to be bound by theory, it is my belief that the protection of the metal surface is accomplished by the interaction of the mercapto moiety of the mercaptoalkyl-substituted organosilicon compound with the metal surface. This reaction product may be represented by the following configuration, in the case of the mercaptoalkylsilane on silver:

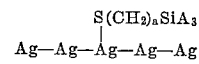

While the silane could be removed from the metal surface by the action of hydrogen sulfide according to the formula:

$$AgS(CH_2)_aSiA_3 + H_2S \rightleftharpoons AgSH + HS(CH_2)_aSiA_3$$

the favored direction of reaction being towards removal, the mercaptoalkylsilane may be firmly bonded to the metal surface by the hydrolysis of the hydrolyzable groups, resulting in an organopolysiloxane resin type of structure which inhibits the removal of the protective material by hydrogen sulfide. The molecular weight and polymeric structure of the mercaptoalkyl-substituted organopolysiloxane prevents its removal through the action of hydrogen sulfide.

The various mercaptoalkylsilanes of Formula 1 can be prepared by methods known in the art. For example, the mercaptoalkylalkoxysilanes can be formed by initially reacting a trihalosilane with an ω-chloro-α-olefin in the presence of a platinum catalyst and heat. The resulting chloroalkylhalosilane is reacted with an alcohol to convert the product to a chloroalkylalkoxysilane, this latter product being reacted with sodium sulfohydride in the presence of dimethylformamide to yield the mercaptoalkylalkoxysilane. This series of reactions can be represented as follows:

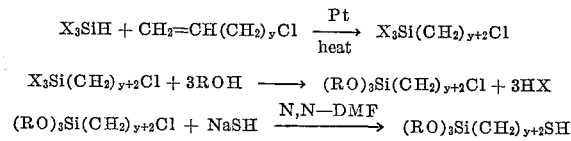

where R is as above defined, X is a halide group, $y$ is an integral number of from 1 to 23, inclusive and N,N-DMF is N,N-dimethylformamide. The mercaptoalkyl-substituted organopolysiloxane can be formed by the reaction of sodium sulfohydride with the ω-chloroalkyl substituent of an organopolysiloxane. The organopolysiloxane is originally formed with the desired content of chloroalkyl substituents so that, on reaction with the sodium sulfohydride, the proper percentage of ω-mercaptoalkyl substituents are present. This series of reactions can be represented as follows:

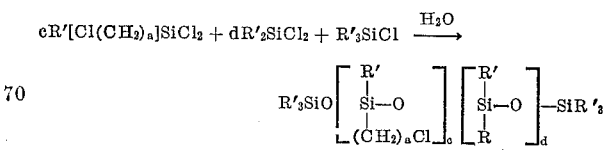

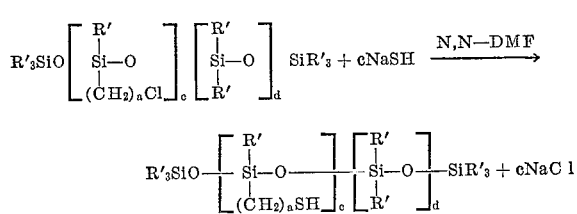

where R', a, c, and d are as previously defined.

The mercaptoalkyl-substituted organosilicon compound is, as mentioned, preferably applied in a solvent solution. A wide variety of solvents may be utilized, depending only upon the end use of the resulting solution. The solvents are chosen for their evaporation rate, the evaporation being slow enough that there is little moisture absorption, but fast enough for the solution to be practical. Preferred solvents which meet these requirements are relatively non-toxic solvents, such as ethanol, methylethylketone, methylpropylketone, ethylbutylketone, methylisobutylketone, and methyl-n-butylketone. Other workable solvents which are more toxic and therefore not as desirable, are various alcohols, ketones, alkanes, and aromatics. Essentially, any organic solvent which is inert to the reactants under the conditions of use may be utilized. The amount of solvent which should be used is enough to give approximately a 1 to 100 percent concentration of the mercaptoalkylsilane, preferably a 5 to 25 percent concentration, as made. The solvent solution for actual application should contain from 3 to 10 percent of the mercaptoalkylsilane or mercaptoalkyl-substituted organopolysiloxane.

In the case of the mercaptoalkylsilane of Formula 1, the solution should additionally contain water in an amount sufficient to partially hydrolyze the hydrolyzable moiety of the mercaptoalkylsilane prior to application of the material to the metal surface to be protected. The amount of water present depends not only upon the amount of silane present, but, additionally, upon the amount of a hydrolysis catalyst present in the solution. Thus, the amount of water can vary within broad limits from amounts which are incapable of measurement to amounts limited by the required concentration of the mercaptoalkylsilane in the solution, but the amount of water is preferably in the range of from 5 to 20 percent, based on that silane. Although it has been noted that no measurable amount of water need be present in the solution as prepared, the silane will be partially hydrolyzed due to the presence of moisture in the air during the preparation of the solution and the curing of the solution on the metal surface to be protected. The hydrolysis catalyst which should be present in the solution is selected from the class consisting of, metal salts, acids and bases. Preferably, the catalyst is a strong acid, such as methyltrichlorosilane or hydrochloric acid. However, other weaker acids, such as acetic acid, can also be utilized. The amount of catalyst present should range from 50 to 1,000 parts per million, preferably from 150 to 200 parts per million, based on the amount of silane present.

In addition to the mercaptoalkylsilane, water, hydrolysis catalyst, and solvent present in the solution, other materials can be present to provide added properties. For example, the mercaptoalkylsilane of Formula 1 can be cohydrolyzed with other silane materials in the prepared solution to gain such advantages as an air-drying film or additional hardness. Preferred materials for these uses are phenyltriethoxysilane and methyltriethoxysilane. However, other silanes, such as γ-aminopropyltriethoxysilane, γ-syanopropyltrichlorosilane, vinyltrichlorosilane, vinyltriethoxysilane, chloropropyltrichlorosilane, γ-(triethoxysilyl)-n-propylacrylate, γ-(trimethoxysilyl)-n-propylmethacrylate, γ-(dichloromethylsilyl)-n-propylacrylate, can be utilized. In general, any organosilane selected from the class consisting of:

(3) $\quad Y_3SiR'$ and (4) $\quad Y_2SiZ_2$ can be utilized. In Formulas 3 and 4, R' is as above defined, Y represents a hydrolyzable group selected from the class consisting of halide radicals, alkoxy radicals, acyloxy radicals, aryloxy radicals, substituted and unsubstituted amine radicals, and substituted ketoxime radicals; and Z is the same as R' and, in addition, the mercaptoalkyl radical. Included among the groups represented by R' in Formulas 2, 3, and 4 are alkyl radicals, such as methyl, ethyl, propyl, isopropyl, amyl, etc., including cycloalkyl radicals, such as cylclopentyl, cyclohexyl, etc.; substituted alkyl radicals, such as cyanoethyl, chloropropyl, acrylopropyl, methacrylopropyl, etc.; aryl radicals, such as phenyl, biphenylyl, naphthyl, tolyl, xylyl, ethylphenyl, etc., including aralkyl radicals, such as benzyl, phenethyl, etc.; and substituted aryl radicals, such as those having cyano and halogen substituents, including chlorophenyl, dibromophenyl, p-cyanophenyl, etc. These materials can be present in an amount of from 1 to 50 mole percent, preferably from 10 to 25 mole percent, based on the mercaptoalkylsilane of Formula 1. Further, non-organosilicon materials, such as acrylic resins, acrylic ester resins, and nitrocellulose can be present in the original solution to gain improved film properties and hardness. The range of these materials which can be used varies from 1:10 to 3:1 of the non-organosilicon resins to the mercaptoalkylsilane.

The mercaptoalkylsilane treating solution is prepared by mixing the mercaptoalkylsilane, water, hydrolysis catalyst, and solvent, and any other desired materials, and heating to accomplish the partial hydrolysis of the silane. After the partial hydrolysis has been accomplished, a material is added to neutralize the hydrolysis catalyst. The solution is then filtered and can be either stored in its concentrated form for further use or may be immediately diluted and then stored. The solutions have a shelf life of greater than four months. The mercaptoalkylsilane solution can be applied to the copper or silver surfaces to be protected by any of the methods well-known in the art. That is, for example, the solution can be sprayed onto the surface, such as in an aerosol, the solution can be brushed onto the surface, or the material to be protected can be dipped into the mercaptoalkylsilane-solvent solution. The particular solvent or solvent mixture selected will, of course, depend upon the method of application. Additionally, the greater the proportion of mercaptoalkylsilane in the prepared solution, prior to dilution, the faster are the air-drying properties of the final material. Sufficient mercaptoalkylsilane-solvent solution is used to provide a coating of from about 1 to 4 grams of solids per square meter of metal surface. After the solution is applied to the metal surface to be protected, the coating can be cured either by air-drying or by oven-drying. Preferably, the solvent solution is formulated so that the coating is tack-free in air in less than 15 minutes. As desired, the coated metal can then be left exposed to air for a longer period of time to complete the cure of the coating or the treated metal can be placed in an oven and cured at temperatures up to 175° C. The maximum of 175° C. is imposed since above that temperature decomposition of the mercaptoalkylsilane begins. It will, of course, be obvious that the time of cure required will vary inversely with the temperature utilized. For example, at about 120° C., a complete oven cure can be accomplished in about 15 minutes. When the treated metal is exposed to air at room temperature, complete cure can require as much as twelve to sixteen hours.

As the mercaptoalkylsilane solution is self-cleaning due to the reaction of the silane, no preparation of the metal surface prior to application is necessary. However, when the mercaptoalkyl-substituted organosilicon compound which is applied is the mercaptoalkyl-substituted organopolysiloxane of Formula 2, the metal surface should be cleaned prior to application of the solution. Any well-known method can be used such as sandblasting, abrasion, or washing with an available commercial detergent. While preparation of the surface is desirable in the case of the mercaptoalkyl-substituted organopolysiloxane, this material provides some advantages which do not inhere in the use of the mercaptoalkylsilane solution. For example, when the polysiloxane is applied to the metal surface, it provides not only corrosion protection, but a degree of lubricity, not obtainable using the mercaptoalkylsilane solution. Following cleaning of the surface, the mercaptoalkyl-substituted organopolysiloxane can be applied by either spraying or brushing the solution onto the metal surface. The mercaptoalkyl-substituted polysiloxane should also be present in an amount of 1–4 g. per square meter of metal to be protected.

Examples 1–6 are illustrative of the use of mercaptoalkylsilanes in metal protectant solutions and of the preparation of such solutions.

The γ-mercaptopropyltrimethoxysilane used in some of the following examples was prepared by placing in a reaction vessel a quantity of 4520 g. (21.2 moles) of γ-chloropropyltrichlorosilane. Over a period of about 16 hours, 3228 g. (69.6 moles) of methanol were added with stirring, while maintaining a temperature of 30°–40° C. and a pressure of 50 mm. Stirring was continued while maintaining the vacuum for an additional 2 hours after completion of the addition to complete reaction. The material remaining in the pot was determined, by vapor phase chromatography and infrared spectroscopy, to be 99% pure γ-chloropropyltrimethoxysilane in an amount of 4230 g.

A quantity of 2580 g. of sodium sulfohydrate $$(NaSH \cdot xH_2O)$$

was placed in a 12-liter flask squipped with a stirrer, thermometer, additional funnel, and two water condensers. The sodium sulfohydrate was dissolved in 850 ml. of water at a temperature of 40° C. To azeotrope all the water from the NaSH, 600 ml. of toluene were added to the pot and the contents were heated to 50° C. at a pressure of 90 to 100 mm. While maintaining the vacuum, the pot temperature was kept at 50° to 60° C. and a total of about 1850 ml. of water was removed at the rate of about 60 ml. per hour. During the removal, a total of 700 ml. of toluene and 1200 ml. of N,N-dimethylformamide was added to the pot. When water removal was completed, one liter of pentane was added to the pot.

While maintaining the pot temperature of the dried NaSH solution at 39°–48° C., the chloropropyltrimethoxysilane, previously produced, was added over a period of about 2½ hours. One liter of N,N-dimethylformamide was added to the pot and the contents were stirred for a period of about 16 hours. The resulting solution was treated with acetic acid and then with sodium bicarbonate and filtered, the filtrate showing a pH of 3.6. The filtrate was distilled and 3022 g. of γ-mercaptopropyltrimethoxysilane was taken off at 3.2 mm. at 75°–76° C. This represented a yield of 73.1% based on the γ-chloropropyltrichlorosilane.

The ω-mercaptohexyltripropoxysilane shown in Example 4 is prepared similarly, except that propanol is substituted for methanol and ω-chlorohexyltrichlorosilane is substituted for the γ-chloropropyltrichlorosilane. The ω-mercaptodecyltriethoxysilane shown in Example 5 is prepared similarly, except that ethanol is substituted for the methanol and ω-chlorodecyltrichlorosilane for the γ-mercaptopropyltrichlorosilane. The γ-mercaptoamyltriacetoxysilane shown in Example 6 is similarly prepared, except that acetic anhydride is substituted for the methanol and ω-chloroamyltrichlorosilane for the γ-chloropropyltrichlorosilane.

*Example 1*

The solution prepared in this example had the following composition:

| | G. |
|---|---|
| $(CH_3O)_3Si(CH_2)_3SH$ | 24.5 |
| Methylethylketone | 95.75 |
| Water | 3.375 |
| $CH_3SiCl_3$ | 0.0245 |

All of the γ-mercaptopropyltrimethoxysilane and one-half of the methylethylketone were placed together and heated to 40° C. While maintaining the temperature at 40° C. and with stirring, the remainder of the methylethylketone, all of the water and all of the methyltrichlorosilane were added. Stirring was continued, while maintaining the temperature, for 2¾ hours. The solution was then neutralized with 3.69 ml. of a 0.134 normal solution of potassium hydroxide in ethanol. The neutralized solution was filtered and, on testing, showed a solids content of 14.24 percent. This solution was diluted to 10% solids with methylethylketone and the resulting solution was applied to both copper and silver surfaces in an amount of 20 g. of solution per square meter of metal to be protected. No tarnish was apparent on either of the surfaces following prolonged exposure to hydrogen sulfide gas.

*Example 2*

The composition of this solution was as follows:

| | G. |
|---|---|
| $(CH_3O)_3Si(CH_2)_3SH$ | 19.6 |
| $C_6H_5Si(OC_2H_5)_3$ | 6.0 |
| Methylethylketone | 96.1 |
| Water | 3.51 |
| Hydrochloric acid (37.4% solution) | 0.0477 |

The γ-mercaptopropyltrimethoxysilane, the phenyltriethoxysilane, and ½ of the methylethylketone were mixed together and heated to 40° C. The remainder of the methylethylketone and all of the water and hydrochloric acid were added to this heated solution with stirring. Stirring was continued for 6.5 hours while maintaining the 40° C. temperature. The solution was neutralized with the same potassium hydroxide-ethanol solution as described in Example 1, and the solution was then filtered. After filtration, the solution was diluted to 10% solids with n-butylcellosolve. Both copper and silver surfaces treated with the solution just described, in an amount of 30 g. of solution per square meter of metal to be protected, showed excellent resistance to tarnishing by hydrogen sulfide.

*Example 3*

The solution of this example had the following composition:

| | G. |
|---|---|
| $(CH_3O)_3Si(CH_2)_3SH$ | 19.6 |
| $(CH_3)_2Si(OC_2H_5)_2$ | 3.5 |
| Methylethylketone | 96.1 |
| Water | 3.57 |
| Hydrochloric acid (37.4% solution) | 0.0477 |

The γ-mercaptopropyltrimethoxysilane, the dimethyldiethoxysilane, and ½ of the methylethylketone were mixed together and heated to 40° C. While maintaining heat and with stirring, the remainder of the methylethylketone and all of the water and hydrochloric acid were added. Stirring was continued for 3.5 hours while the temperature was raised to 50° C. The solution was then neutralized with 5 ml. of a 0.139 normal solution of potassium hydroxide in ethanol. The solution was filtered and cut to a 10% solids solution with methylethylketone. Application of the solution to both silver and copper surfaces, in an amount of 15 g. of solution per square meter of surface to be protected, prevented tarnishing even after continued exposure to hydrogen sulfide gas.

Example 4

A solution is prepared containing the following components:

| | Parts |
|---|---|
| $(C_3H_6O)_3Si(CH_2)_6SH$ | 20 |
| Water | 5 |
| Methylisobutylketone | 40 |
| $CH_3SiCl_3$ | .004 |

The ω-mercaptohexyltripropoxysilane and one-half of the methylisobutylketone are mixed and heated to 50° C. A mixture containing the remainder of the methylisobutylketone and all of the water and methyltrichlorosilane is then added and the resulting solution is stirred for about 5 hours, while maintaining the temperature at 50° C. Following this reaction period, the solution is neutralized with a potassium hydroxide solution and yields a solution having approximately 20% solids. This solution is diluted to 4% solids with ethanol and, when applied to silver and copper surfaces in an amount of 50 g. of solution per square meter of metal to be protected, provides protection against tarnishing.

Example 5

A solution is prepared containing the following components:

| | Parts |
|---|---|
| $(C_2H_5O)_3Si(CH_2)_{10}SH$ | 7.5 |
| Water | 0.375 |
| Toluene | 94 |
| Hydrochloric acid (37.4% solution) | 0.003 |

The ω-mercaptodecyltriethoxysilane and one-half of the toluene are placed in a vessel and heated to 40° C. Subsequently, a mixture containing the remaining toluene and all of the water and hydrochloric acid is added and stirring is continued, while maintaining the temperature, for 3 hours. The resulting solution is neutralized with a potassium hydroxide solution and, on filtration, yields a mercaptodecylorganosilicon composition having a solids content of about 5.5%. When diluted to 3.5% with isopropanol, this solution protects silver and copper surfaces from tarnishing when applied in an amount of about 60 g. per square meter of metal to be protected.

Example 6

A solution is prepared containing the following components:

| | Parts |
|---|---|
| $(CH_3COO)_3Si(CH_2)_5SH$ | 10 |
| $(C_2H_5O)_3Si(CH_3)$ | 2.3 |
| Potassium hydroxide | .001 |
| Propanol | 37.6 |
| Methylisoamylketone | 52.3 |
| Water | 5 |

The ω-mercaptoamyltriacetoxysilane, the methyltriethoxysilane and the propanol are placed in a reaction vessel and heated to 60° C. Subsequently, a mixture containing the methylisoamylketone, the water, and the potassium hydroxide is added with stirring and the stirring is continued while maintaining the temperature for 3 hours. The resulting solution is neutralized with ammonia and, on filtration, yields a copolymer solution having a solids content of about 8%. This solution, when applied as made, in an amount of about 50 g. of solution per square meter of surface to be protected, protects copper and silver surfaces from tarnishing.

Example 7

In this example, a mercaptoalkyl-substituted organopolysiloxane having the average formula:

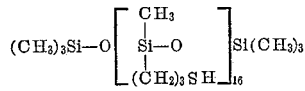

essentially equivalent to Formula 2 where each R' was methyl, c was 16, and d was 0, was used. A chloropropylmethylpolysiloxane was prepared by placing 2101 g. (11 moles) of chloropropylmethyldichlorosilane and 154 g. (1.4 moles) of trimethylchlorosilane into a reaction vessel, and adding, in 2–3 g. aliquots, 250 g. of water. The mixture was stirred during the two hour addition, the temperature ranging from 8° C. to 21° C. Stirring was continued for an additional hour and 300 ml. of hexane was added. About 120 ml. of ethanol were added and water was azeotroped from the mixture, followed by about 100 ml. of hexane to remove any remaining water. The solvent was then stripped off to a pot temperature of 140° C. and, while hot, 1% of carbon black and 5% of fuller's earth were added and the mixture was filtered through a bed of Celite 545. This yelded 1551 g. (96.1% based on the theoretical) of a fluid having a viscosity of 26.9 centistokes at 100° F. The mercaptopropylorganopolysiloxane fluid was formed by reacting 550 g. of the chloropropylmethylpolysiloxane with 289 g. of sodium sulfohydride in the presence of 500 g. of dimethylformamide. The chloropropylmethylpolysiloxane was placed in a reaction vessel and heated to 40° C. A solution was prepared of the sodium sulfohydride and the dimethylformamide which was added in 3–5 g. aliquots over a period of about 2½ hours. The reaction temperature rose from 50° C. to 85° C., at which point 200 ml. of hexane were added. The temperature dropped to 62° C. and remained there through the balance of the reaction. Water was added to the reaction mixture and the hexane and mercaptopropyl-substituted polysiloxane were separated. The solvent-fluid layer was washed 5 times with water, dried with 2% sodium sulfate, and 1% fuller's earth, and the fluid filtered through a bed of Celite 545. The clear fluid was stripped of excess hexane to a pot temperature of 140° C., cooled, and refiltered through Celite 545. The yield was 471 g. (87% yield based on the theoretical) of a fluid having a viscosity at 100° F. of 35.4 centistokes. The structure of a fluid of Formula 2 as recited in this example was confirmed by infrared analysis.

A toluene solution was prepared containing 10% of the mercaptopropyl-substituted organopolysiloxane. Two bronze and two copper plates were cleaned with a commercial metal cleaner containing a small amount of detergent mixed with an abrasive, and one of each of the types of metals was coated with the mercaptopropyl-substituted organopolysiloxane by wiping the solution onto the metal plate. Coverage was about 3 g. of the fluid per square meter of metal to be protected. Each of the plates was placed in a container and hydrogen sulfide was flooded into the container and continued at a rate of 8 ml./min. for 15 minutes. At this point, the surface of each of the non-coated plates was completely corroded. After one hour, each of the coated specimens had a slightly darker cast, but no noticeable corrosion. Their appearance had not changed after four hours.

Example 8

In this example, a mercaptopropyl-polysiloxane was prepared having the average formula:

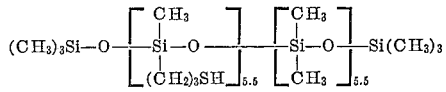

equivalent to the organopolysiloxane of Formula 2 where R' was methyl, a was 3, the sum of c and d was 11, and c was equal to d. The method of preparation was the same as in Example 7, 1050.5 g. of methylchloropropyldichlorosilane, 709.5 g. of dimethyldichlorosilane, 213 g. of trimethylchlorosilane, and 250 g. of water being reacted to form the methylchloropropylpolysiloxane. The mercaptopropyl-substituted organopolysiloxane was formed by reacting 100 g. of the methylchloropropylpolysiloxane with 40.5 g. of sodium sulfohydride and 150 g. of dimethylformamide in the same manner as described in Example 7. A 10% solution of the mercaptoalkyl-substituted organopolysiloxane was prepared in the same manner as in Example 7, and produced corrosion-resistant coatings which were as effective as those of Example 7.

A series of plates were coated with solutions formed according to this invention and commercial products sold as tarnish-inhibitors for silver and copper. In each case, one drop of one of the solutions was applied to a small silver or copper plate. The plates were either air or oven-dried, according to the particular method noted with each series of tests, and then exposed for a sustained period of time to a concentrated atmosphere of hydrogen sulfide. The solutions formed according to this invention were solutions of γ-mercaptopropyltriethoxysilane. These solutions, designated A, were 7% solutions having the following composition:

| | | |
|---|---|---|
| $(CH_3O)_3Si(CH_2)_3SH$ | percent | 7 |
| t-Butanol | do | 2.78 |
| Butylcellosolve | do | 2.78 |
| Methanol | do | 9.26 |
| Methylethylketone | do | 46.04 |
| Acetone | do | 31.48 |
| $CH_3SiCl_3$ | p.p.m. | [1] 180 |
| Water | percent | 0.65 |

[1] Based on mercaptosilane.

The commercially available product, designated B, was a 7.5% solution of an organopolysiloxane modified epoxy resin. The solvent for this epoxy resin was composed of 90% toluene, 5% n-butanol, and 5% butylcellosolve. Solution C was a cohydrolyzate of aminopropyltriethoxysilane and vinyltriethoxysilane, sold as a 10% solution in ethanol. This material was cut to 7% solids with ethanol. Solution D was a commercial silver tarnish-inhibitor comprising a 25.3% solution of an acrylic resin in a solvent composed of methylethylketone and mineral spirits.

The numerical values in the following tables for degree of tarnishing are based on the following scale:

(1) Not tarnished
(2) Slightly tarnished
(3) Moderately tarnished
(4) Tarnished
(5) Badly tarnished Table I shows the area covered and the tarnish values observed by visual observation for both air-cured and oven-cured systems using a 7% solution of A, a 7.5% solution of B, a 7% solution of C, and a 25.3% solution of D on silver surfaces. The oven-cure was for 15 minutes at 250° F., while the air-cure was for 16 hours at room temperature. Each of the samples was exposed to a hydrogen sulfide atmosphere, at room temperature, for 12 hours after curing was completed.

TABLE I

| Material | Area covered, c.m.², approx. | Air cure | Oven cure |
|---|---|---|---|
| A | 5.75 | 1 | 1 |
| B | 3 | 4 | 4 |
| C | 2 | 5 | 5 |
| D | 2.75 | 4 | 4 |

The results shown in Table II are for the same solutions under the same conditions, but on copper metal plates.

TABLE II

| Material | Area covered, c.m.², approx. | Air cure | Oven cure |
|---|---|---|---|
| A | 2.75 | 2 | 2 |
| B | 2 | 5 | 5 |
| C | 3.5 | 5 | 4 |
| D | 3.5 | 5 | 5 |

Table III shows the results of exposing plates coated with a 3.5% solution of A, cut with methylethylketone, and a 3.5% solution of D, cut with a mixture of methylethylketone and mineral spirits. The results are on silver plates exposed to hydrogen sulfide for 24 hours.

TABLE III

| Material | Area covered, c.m.², approx. | Air cure | Oven cure |
|---|---|---|---|
| A | 4 | 1 | 1 |
| D | 1 | 3 | 3 |

Thus, it can be sen that not only was markedly superior tarnish resistance obtained using solutions of the material of the present invention, but the area protected was, in the case of silver, significantly larger, while for copper, approximately the same area was covered, as compared to the commercial solutions.

It is, therefore, apparent that an extremely effective tarnish protectant for both silver and copper is shown according to the present invention. Not only is superior resistance to tarnish obtained, but additionally, superior coverage as compared to materials of the prior art.

Organopolysiloxanes of Formula 2 where $d$ is larger than $c$ and mercaptoalkylsilanes of the formula:

$$AR'_2Si(CH_2)_aSH$$

where A, R', and $a$ are as previously defined can also be applied to the metal surfaces described, and give a measure of corrosion protection. However, the full protection afforded by the materials previously described is not obtained.

The material of the present invention can be applied by the manufacturer of silver and copper metal products, or the material can be applied by the purchase of such products by a variety of methods, such as from an aerosol spray or a liquid solution. While specific embodiments of the invention have been shown and described, they should not be interpreted as limiting the invention to the particular formulations and methods of application shown. The full scope of the present invention is covered in the appended claims.

What I claim as new and desire to secure by Letters Patent of the United States is:

1. A compound for protecting silver and copper metal surfaces from corrosion comprising a mercaptoalkyl-substituted organosilicon compound selected from the class consisting of mercaptoalkylsilanes having the formula:

$$A_3Si(CH_2)_aSH$$

and mercaptoalkyl-substituted organopolysiloxanes having the formula:

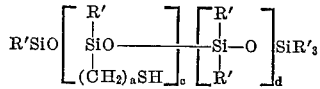

where A is a hydrolyzable group selected from the class consisting of alkoxy radicals of 1 to 6 carbon atoms and acetoxy radicals; $a$ is an integral number of from 3 to 25, inclusive; R' is a monovalent hydrocarbon radical selected from the group consisting of methyl, ethyl, propyl, isopropyl, amyl, cyclopentyl, cyclohexyl, cyanoethyl, chloropropyl, acrylopropyl, methacrylopropyl, phenyl, biphenyl, naphthyl, tolyl, xylyl, ethylphenyl, benzyl, phenylethyl, chlorophenyl, dibromophenyl, and p-cyanophenyl radicals; the sum of $c$ and $d$ is from 10 to 100, $c$ is at least as large as $d$, and $d$ can vary from 0 up to the value of $c$.

2. A compound for protecting silver and copper metal surfaces from corrosion comprising a mercaptoalkylsilane of the formula:

$$(RO)_3Si(CH_2)_aSH$$

where R is an alkyl radical of from 1 to 6 carbon atoms and $a$ is an integral number of from 3 to 6, inclusive.

3. A compound for protecting silver and copper metal surfaces from corrosion comprising a mercaptoalkylsilane of the formula:

$$(CH_3O)_3Si(CH_2)_3SH$$

4. A composition of matter for protecting silver and copper metal from corrosion comprising from 3 to 10 percent of a mercaptoalkylsilane of the formula:

$$A_3Si(CH_2)_aSH$$

where A is a hydrolyzable group selected from the class consisting of alkoxy radicals of 1 to 6 carbon atoms and acetoxy radicals and $a$ is an integral number of from 3 to 25, inclusive; from 0.05 to 0.20 part water, based on the mercaptoalkylsilane; from 50 to 1,000 parts per million of a hydrolysis catalyst, based on the mercaptoalkylsilane; the balance consisting essentially of at least one organic solvent inert to the aforementioned components of the composition.

5. A composition of matter for protecting silver and copper metal from corrosion comprising from 3 to 10 percent of a mercaptoalkylsilane of the formula:

$$(RO)_3Si(CH_2)_aSH$$

where R is an alkyl radical of from 1 to 6 carbon atoms, inclusive, and $a$ is an integral number of from 3 to 6, inclusive; from 0.05 to 0.20 part water, based on the mercaptoalkylsilane; from 150 to 200 parts per million of an acid, based on the mercaptoalkylsilane; the balance consisting essentially of at least one organic solvent inert to the aforementioned components.

6. The composition of claim 5, wherein the mercaptoalkysilane is γ-mercaptopropyltrimethoxysilane and the solvent is selected from the class consisting of ethanol, methylethylketone, methylpropylketone, ethylbutylketone, methylisobutylketone, and methyl-n-butylketone.

7. The composition of claim 5 containing, in addition, from 1 to 50 mole percent, based on the mercaptoalkylsilane, of an additional organosilane selected from the class consisting of phenyltriethoxysilane, dimethyldiethoxysilane, and methyltriethoxysilane.

8. The composition of claim 7, wherein said additional organosilane is contained in an amount of from 10 to 25 mole percent.

9. The composition of claim 7, wherein said additional silane is phenyltriethoxysilane.

10. The composition of claim 7, wherein said additional silane is dimethyldiethoxysilane.

11. The composition of claim 7, wherein said additional silane is methyltriethoxysilane.

12. A compound for protecting silver and copper metal surfaces from corrosion comprising a mercaptoalkyl-substituted organopolysiloxane of the formula:

$$R'SiO\left[\begin{array}{c}R'\\|\\Si-O\\|\\(CH_2)_aSH\end{array}\right]_c\left[\begin{array}{c}R'\\|\\Si-O\\|\\R'\end{array}\right]_d SiR'_3$$

where R' is an alkyl radical having from 1–5 carbon atoms, $a$ is an integral number of from 3 to 6, inclusive, the sum of $c$ and $d$ is from 10 to 30, $c$ is at least as large as $d$, and $d$ can vary from 0 up to the value of $c$.

13. A compound for protecting silver and copper metal surfaces from corrosion comprising a mercaptoalkyl-substituted organopolysiloxane having the average formula:

$$(CH_3)_3Si-O\left[\begin{array}{c}CH_3\\|\\Si-O\\|\\(CH_2)_3SH\end{array}\right]_{16}Si(CH_3)_3$$

14. A compound for protecting silver and copper metal surfaces from corrosion comprising a mercaptoalkyl-substituted organopolysiloxane having the average formula:

$$(CH_3)_3Si-O\overset{CH_3}{\underset{(CH_2)_3SH}{Si}}-O\overset{CH_3}{\underset{CH_3}{Si}}-OSi(CH_3)_3$$

15. A method for protecting silver and copper metal surfaces from corrosion comprising applying to the surface a mercaptoalkyl-substituted organosilicon compound selected from the class consisting of mercaptoalkylsilanes having the formula:

$$A_3Si(CH_2)_aSH$$

and mercaptoalkyl-substituted organopolysiloxanes having the formula:

$$R'_3SiO\left[\begin{array}{c}R'\\|\\Si-O\\|\\(CH_2)_aSH\end{array}\right]_c\left[\begin{array}{c}R'\\|\\Si-O\\|\\R'\end{array}\right]_d SiR'_3$$

where A is a hydrolyzable group selected from the class consisting of alkoxy radicals of 1 to 6 carbon atoms and acetoxy radicals; $a$ is an integral number of from 3 to 25, inclusive; R' is a monovalent hydrocarbon radical selected from the class consisting of methyl, ethyl, propyl, isopropyl, amyl, cyclopentyl, cyclohexyl, cyanoethyl, chloropropyl, acryloropyl, methacrylopropyl, phenyl, biphenyl, naphthyl, tolyl, xylyl, ethylphenyl, benzyl, phenylethyl, chlorophenyl, dibromophenyl, and p-cyanophenyl radicals; the sum of $c$ and $d$ is from 10 to 100, $c$ is at least as large as $d$, and $d$ can vary from 0 up to the value of $c$.

16. A surface selected from the class consisting of silver metal and copper metal treated with mercaptoalkyl-substituted organosilicon compound selected from the class consisting of mercaptoalkylsilanes having the formula:

$$A_3Si(CH_2)_aSH$$

and mercaptoalkyl-substituted organopolysiloxanes having the formula:

$$R'_3SiO\left[\begin{array}{c}R'\\|\\Si-O\\|\\(CH_2)_aSH\end{array}\right]_c\left[\begin{array}{c}R'\\|\\Si-O\\|\\R'\end{array}\right]_d SiR'_3$$

where A is a hydrolyzable group selected from the class consisting of alkoxy radicals of 1 to 6 carbon atoms and acetoxy radicals; $a$ is an integral number of from 3 to 25, inclusive; R' is a monovalent hydrocarbon radical selected from the class consisting of methyl, ethyl, propyl, isopropyl, amyl, cyclopentyl, cyclohexyl, cyanoethyl, chloropropyl, acryloropyl, methacrylopropyl, phenyl, biphenyl, naphthyl, tolyl, xylyl, ethylphenyl, benzyl, phenylethyl, chlorophenyl, dibromophenyl, and p-cyanophenyl radicals; the sum of $c$ and $d$ is from 10 to 100, $c$ is at least as large as $d$, and $d$ can vary from 0 to the value of $c$, for protecting the metal surface from corrosion.

References Cited

UNITED STATES PATENTS

| | | | |
|---|---|---|---|
| 2,719,860 | 10/1955 | Morris | 260—448.8 |
| 3,061,467 | 10/1962 | Vincent | 117—135.1 XR |
| 3,101,277 | 8/1963 | Eder et al. | 117—132 XR |
| 3,215,718 | 11/1965 | Ryan. | |
| 3,248,235 | 4/1966 | Pryor et al. | 148—24 XR |
| 3,278,484 | 10/1966 | Tesoro | 260—448.2 XR |

ALEXANDER H. BRODMERKEL, *Primary Examiner.*

L. B. HAYES, *Assistant Examiner.*

UNITED STATES PATENT OFFICE
CERTIFICATE OF CORRECTION

Patent No. 3,346,405                 October 10, 1967

Richard V. Viventi

It is certified that error appears in the above identified patent and that said Letters Patent are hereby corrected as shown below:

Column 11, line 4, the formula should appear as shown below:

$$(CH_3O)_3Si(CH_2)_3SH$$

Signed and sealed this 3rd day of March 1970.

(SEAL)
Attest:

Edward M. Fletcher, Jr.                 WILLIAM E. SCHUYLER, JR.
Attesting Officer                            Commissioner of Patents

Notice of Adverse Decision in Interference

In Interference No. 96,671, involving Patent No. 3,346,405, R. V. Viventi, METAL PROTECTANT, final judgment adverse to the patentee was rendered July 16, 1976, as to claims 2, 15 and 16.

[*Official Gazette November 30, 1976.*]